United States Patent
Henken et al.

(10) Patent No.: US 11,113,993 B2
(45) Date of Patent: Sep. 7, 2021

(54) CLEANING SYSTEM, CLEANING DEVICES, INSTRUCTION INSERT, AND METHODS THEREFOR

(71) Applicant: Medline Industries, Inc., Mundelein, IL (US)

(72) Inventors: Megan Henken, Wauconda, IL (US); Steve McNabb, Kenosha, WI (US)

(73) Assignee: Medline Industries, Inc., Northfield, IL (US)

( * ) Notice: Subject to any disclaimer, the term of this patent is extended or adjusted under 35 U.S.C. 154(b) by 1391 days.

(21) Appl. No.: 14/828,272

(22) Filed: Aug. 17, 2015

(65) Prior Publication Data
US 2017/0053549 A1   Feb. 23, 2017

(51) Int. Cl.
G09B 29/00 (2006.01)
G09B 5/02 (2006.01)
A47L 13/51 (2006.01)
A47L 13/16 (2006.01)
G09B 19/00 (2006.01)

(52) U.S. Cl.
CPC ............ G09B 29/003 (2013.01); A47L 13/16 (2013.01); A47L 13/51 (2013.01); G09B 5/02 (2013.01); G09B 19/003 (2013.01)

(58) Field of Classification Search
CPC .......... A47L 13/16; G09B 5/02; G09B 29/003
USPC ....................................................... 434/219
See application file for complete search history.

(56) References Cited

U.S. PATENT DOCUMENTS

| | | | |
|---|---|---|---|
| 3,133,376 A | 5/1964 | Orenstein | |
| 4,802,855 A | 2/1989 | Wood | |
| 5,145,377 A * | 9/1992 | Tarvin | G09B 19/00 434/170 |
| 5,312,257 A * | 5/1994 | Tarvin | G09B 21/00 434/170 |
| 5,507,065 A | 4/1996 | McBide et al. | |
| 5,851,117 A * | 12/1998 | Alsheimer | G09B 19/00 434/219 |
| 5,918,341 A | 7/1999 | Hale | |

(Continued)

FOREIGN PATENT DOCUMENTS

| | | |
|---|---|---|
| CA | 2376186 | 1/2001 |
| WO | 200800216 9 | 1/2008 |
| WO | 201101602 3 | 2/2011 |

OTHER PUBLICATIONS

Fernstrom, Kurt, "NonFinal Office Action", U.S. Appl. No. 15/194,252, filed Jun. 27, 2016; dated Jun. 7, 2018.

(Continued)

*Primary Examiner* — Robert P Bullington (74) *Attorney, Agent, or Firm* — Philip H. Burrus, IV (57) ABSTRACT

A visual teaching aid (100) assists teaching a cleaning order for a predefined area (106). The visual teaching aid can include a legend portion (103) defining a plurality of portions (105) of the predefined area, while a predefined area portion (104) pictorially illustrates the plurality of portions. The legend portion can define a plurality of sequential numerical indicia (107) indicating a predefined order in which the plurality of portions should be cleaned. The predefined area portion can include a plurality of visual indicators (110) assigned to the plurality of portions on a one-to-one basis. The visual teaching aid can be included with one or more cleaning cloths (300,500) in a cleaning package assembly (700).

19 Claims, 7 Drawing Sheets

(56) References Cited

U.S. PATENT DOCUMENTS

| | | | |
|---|---|---|---|
| D412,890 S | 8/1999 | Nesenoff | |
| 6,074,211 A | 6/2000 | Reid | |
| 6,325,630 B1 | 12/2001 | Grabmayr | |
| 6,390,822 B1 | 5/2002 | Murphy et al. | |
| D565,588 S | 4/2008 | Sherry | |
| D597,850 S | 8/2009 | Quick et al. | |
| 8,077,555 B1 | 12/2011 | Lovato | |
| D681,117 S | 4/2013 | Tetrault | |
| 8,800,094 B1 | 8/2014 | Robinson | |
| D714,865 S | 10/2014 | Jon | |
| 9,089,885 B2 | 7/2015 | Taylor et al. | |
| D736,314 S | 8/2015 | Urdarevik | |
| 9,839,712 B2 | 12/2017 | Bommarito | |
| 9,940,850 B1 | 4/2018 | Oliva | |
| 10,990,777 B1 | 4/2021 | Schenk et al. | |
| 2003/0121117 A1* | 7/2003 | Isenberg | A47L 13/16 15/209.1 |
| 2003/0233717 A1 | 12/2003 | Ortega et al. | |
| 2006/0110719 A1 | 5/2006 | DeLack Hultin et al. | |
| 2006/0121423 A1* | 6/2006 | Hutchison | G09B 19/00 434/219 |
| 2006/0223731 A1 | 10/2006 | Carling et al. | |
| 2008/0128492 A1 | 12/2008 | Roth | |
| 2009/0248499 A1* | 10/2009 | Carling | A61L 2/18 434/365 |
| 2010/0133125 A1* | 6/2010 | Weinberger | A47L 25/00 206/216 |
| 2011/0041276 A1 | 2/2011 | Edwards et al. | |
| 2011/0114734 A1* | 5/2011 | Tiedmann | G06K 19/02 235/492 |
| 2012/0301865 A1 | 11/2012 | Taylor | |
| 2012/0325710 A1* | 12/2012 | Woulms | G09B 25/00 206/459.5 |
| 2013/0125307 A1 | 5/2013 | Margalit | |
| 2013/0269137 A1 | 10/2013 | Tekulve et al. | |
| 2014/0020710 A1* | 1/2014 | Williams | A47L 13/16 134/6 |
| 2015/0140532 A1 | 5/2015 | Whitney | |
| 2017/0053565 A1 | 2/2017 | Henken | |
| 2017/0124917 A1 | 5/2017 | Henken | |
| 2017/0340410 A1 | 11/2017 | Maalouf et al. | |
| 2018/0286215 A1 | 10/2018 | Christensen | |
| 2020/0154970 A1 | 5/2020 | Henken et al. | |

OTHER PUBLICATIONS

Fernstrom, Kurt, "Final OA", U.S. Appl. No. 15/194,252, filed Jun. 27, 2016; dated May 6, 2019.

Fernstrom, Kurt, "NonFinal OA", U.S. Appl. No. 15/194,252, filed Jun. 27, 2016; dated Nov. 19, 2018.

Fletcher, Jerry-Daryl, "Non-Final Office Action", U.S. Appl. No. 15/407,042, filed Jan. 16, 2017; dated Mar. 21, 2019.

Fletcher, Jerry-Daryl, "Final Office Action", U.S. Appl. No. 15/407,042, filed Jan. 16, 2017; dated Jul. 3, 2019.

"Deposit Photos", Link: https://www.depositphotos.com/similar-vectors/216637402.html?qview-171698504; Visited Feb. 23, 2021; Hospital operating room with people. (Year: 2021).

"Shutterstock", Link: https://www.shutterstock.com/image-vector/isometric-flat-interior-hospital-room-3d-482477011; Visited Feb. 23, 2021; Isometric flat interior of hospital room. Flat 3D illustration. (Year: 2021).

"Vectorsotck", Link: https://www.vectorstock.com/royalty-free-vector/isometric-low-poly-operating-room-vector-13215604; Visited Feb. 23, 2021; Isometric low poly operating room vector image. (Year: 2021).

"Vectorstock", Link: https://www.vectorstock.com/royalty-free-vector/isometric-cozy-hospital-room-vector-33301858; Visited Feb. 23, 2021 Isometric cozy hospital room vector image. (Year: 2021).

"Vectorstock", Link: https://www.vectorstock.com/royalty-free-vector/operating-room-isometric-interior-vector-35794611; Visited Feb. 23, 2021; Isometric cozy hospital room vector image. (Year: 2021).

Fernstrom, Kurt, "Appeal Decision", U.S. Appl. No. 15/194,252; Filed Jun. 27, 2016; dated Mar. 30, 2021.

Fletcher, Jerry-Daryl, "NonFinal Office Action", U.S. Appl. No. 15/407,042; Filed Jan. 16, 2017; dated Dec. 16, 2019.

Mcvey, Lauren, "Notice of Allowance", U.S. Appl. No. 29/721,529; Filed Jan. 21, 2020; dated Mar. 5, 2021.

* cited by examiner

CLEANING SYSTEM, CLEANING DEVICES, INSTRUCTION INSERT, AND METHODS THEREFOR

BACKGROUND

Technical Field

This disclosure relates generally to cleaning systems, and more particularly to cleaning systems in accordance with predefined methods.

Background Art

Cleaning articles are frequently procured as generic, commodity components. For example, cleaning cloths may be purchased in a roll, with the technique, application, and usage of each sheet left entirely up to the end user. If the user has not been properly trained to use a particular cleaning article, they may in fact cause more contamination than they reduce. It is known, for instance, that cleaning towels and cloths accumulate numerous germs and bacteria during the cleaning process. When used inappropriately, especially within a healthcare setting, some cleaning products can actually increase the chance for transmitting infection. This problem is compounded when a user is attempting to clean rooms quickly, as they frequently fail to adequately clean contact surfaces. Moreover, even when cleaning slowly people often fail to adequately clean surfaces for a variety of reasons. These reasons include accidents, the fact that the person cleaning did not know the surface was to be cleaned, and so forth.

It would be advantageous to have an improved cleaning system teaching aid, and methods for cleaning articles, especially for use in health care applications.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and devices to assist in the training of medical personnel. Embodiments of the disclosure assist health care personnel in understanding how to clean a predefined area, such as a patient's room, in what particular order the portions of the area should be cleaned, and how to use cleaning articles included with a cleaning package assembly to provide a systematic approach that reduces the chance that a patient will acquire an infection. In one embodiment, a teaching device that can be configured as a teaching aid or teaching insert in a cleaning package assembly that describes an order in which items in a predefined area, such as a hospital room, should be cleaned. A primary advantage of embodiments of the disclosure is that the teaching aid or insert, combined with the plurality of sequential numerical indicia defining a cleaning order for a predefined area that are included with the cleaning package assembly, encourages a person cleaning to identify the appropriate areas to be cleaned, thereby ensuring they will not be missed. Embodiments if the disclosure also encourage the person cleaning to clean those surfaces in the most efficient and sanitary way and/or order.

In one embodiment, a teaching aid includes a legend portion and a predefined area portion. The teaching aid is to assist teaching a cleaning order for a predefined area, such as a patient's hospital room. The legend portion can define a plurality of portions of the predefined area, while the predefined portion area pictorially illustrates the plurality of portions. In one embodiment, the legend portion can include one or more matrices that list, in a 1×N matrix, restroom portions and patient room portions to be cleaned. In one embodiment, these matrices include a restroom matrix and an additional room matrix. In one embodiment, the additional room is a patient's portion of a hospital room that is exterior to the restroom.

In one embodiment, the items presented in each matrix are associated with a plurality of sequential numerical indicia. Said differently, in one embodiment the legend portion can define a plurality of sequential numerical indicia defining a predefined order in which the plurality of portions of a predefined area should be cleaned. In one embodiment, the restroom matrix includes a first subset of the plurality of sequential numerical indicia, while the additional room matrix includes a second subset of the plurality of sequential numerical indicia. The first subset and the second subset can be non-overlapping. Illustrating by example, in one embodiment the legend portion describes sixteen contact points within a hospital room with eight set forth in the restroom matrix and eight set forth in the additional room matrix.

In one embodiment, the additional room matrix can define additional room portions each associated with one of the plurality of sequential indicia on a one-to-one basis. Explanatory additional room portions include: bed rails; a nurse call device; a patient table; a remote control; a table; a television; a light switch; and doorknobs. In one embodiment the restroom portions arranged in this predefined order, with each portion corresponding to the numbers one through eight, inclusive.

Similarly, the restroom matrix can define restroom portions each associated with one of the plurality of sequential indicia on a one-to-one basis. Explanatory restroom portions include: a toilet seat; hand rails; restroom walls; a toilet bowl; a storage area; a shower; a sink; and doorknobs. In one embodiment the restroom portions arranged in this predefined order, with each portion corresponding to the numbers nine through sixteen, inclusive.

In one embodiment, the predefined area portion includes a plurality of visual indicators assigned to the plurality of portions of the predefined area on a one-to-one basis, with each visual indicator comprising one of the plurality of sequential numerical indicia. For example, in one embodiment each of the plurality of visual indicators comprises a circle with a number superimposed on the circle. Accordingly, if the television of the patient's room is set forth as number six in the additional room matrix, the predefined area portion may include a pictorial illustration of the television with a circle with the number "6" illustrated graphically on the pictorial representation of the television. The other items of the predefined area can be similarly represented in the predefined area portion.

Accordingly, in one embodiment sixteen contact points in a hospital room are numbered on the teaching aid in the order in which they should be cleaned. Personnel can begin with the number "1" and follow the numbers in order to ensure that all sixteen cleaning locations are clean. In one or more embodiments, these numbers are arranged in a manner that increases efficiency by putting them in an order that logically follows a predefined flow throughout the room to ensure that all personnel clean in the same manner and same order to create a systematic approach that ensures compliance with hygiene standards. Supervisory personnel can follow-up with weekly spot checks or adenosine triphosphate meters to verify that each of the various contact points are being cleaned.

It should be noted that while a hospital room is used herein as an explanatory predefined area, embodiments of the disclosure are not so limited. The teaching aid, cleaning articles, and cleaning package assemblies of embodiments of the disclosure can also be used to clean hotel rooms, dormitory rooms, motel rooms, and other rooms as well. Still other predefined areas will be obvious to those of ordinary skill in the art having the benefit of this disclosure. The visual teaching aids and methods described below can be applied to a wide variety of predefined areas where various portions are to be cleaned sequentially.

Embodiments of the disclosure provide a teaching aid that simplifies the understanding of proper cleaning techniques. Identifying the proper order of cleaning a predefined area, as well as the proper way to use corresponding cleaning articles, is frequently confusing to cleaning personnel. However, the use of teaching aids configured in accordance with embodiments of the disclosure offers a teaching tool that is easily understandable by many types of learners. Accordingly, the use of teaching aids configured in accordance with embodiments of the disclosure results in rooms being more efficiently and accurately cleaned. This is important because the consequences of improper cleaning can result in an increased infection transmission rate.

Figure 1:
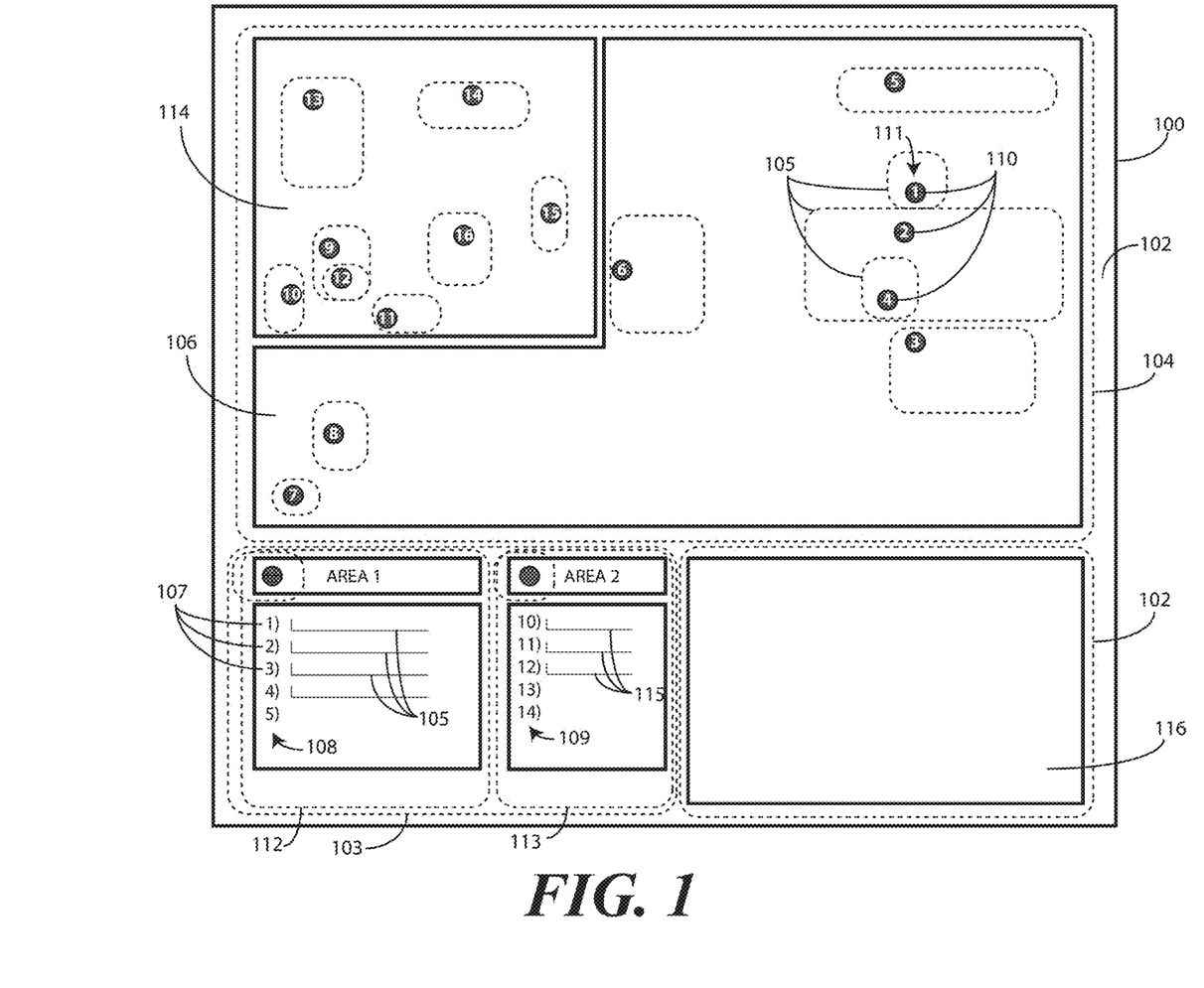
FIG. 1 illustrates one explanatory embodiment of a teaching aid in accordance with one or more embodiments of the disclosure.

Turning now to FIG. 1, illustrated therein is one embodiment of a visual teaching aid 100 configured in accordance with one or more embodiments of the disclosure. The visual teaching aid 100 is to assist in teaching a cleaning order for a predefined area, such as a patient's room in a hospital. In this embodiment, the visual teaching aid 100 of FIG. 1 is disposed along a substantially flat substrate 102, such as a piece of paper, poster board, cardboard, card stock, film, laminate, plastic sheeting, or other substantially flat substrate upon which printing can be disposed. In one or more embodiments where the substantially flat substrate 102 is paper-based, the visual teaching aid 100 can be laminated as well.

While the substantially flat substrate 102 is singular in the embodiment of FIG. 1, with all information disposed along a single major face of the substantially flat substrate 102, the visual teaching aid 100 could be configured in other ways as well. For example, the visual teaching aid 100 could be configured as a stack of cards, a stack of flash cards, a bi-fold, tri-fold, or multi-fold pamphlet, scroll, or booklet. Additionally, the substantially flat substrate 102 could be a garment, such as a t-shirt or other garment. In one embodiment, the substantially flat substrate 102 is configured as a folio or cover for a tablet computer or palm-top computer. The substantially flat substrate 102 could also be configured as a case for a laptop computer or a medical journal. Still other examples of substantially flat substrates will be obvious to those of ordinary skill in the art having the benefit of this disclosure. For example, as will be shown in FIG. 9 below, the visual teaching aid 100 could be configured for presentation on a tablet or other type of computer as well.

In one embodiment, the visual teaching aid 100 comprises a legend portion 103 and a predefined area portion 104. The legend portion 103 can define a plurality of portions 105 of the predefined area 106, while the predefined area portion 104 pictorially illustrates the plurality of portions 105. Illustrating by example, where the predefined area 106 is a patient's hospital room, the plurality of portions 105 may include bed rails, a nurse call device, a patient table, a remote control, a table, a television, a light switch, and doorknobs, with each of these being pictorially shown in the predefined area portion 104. These can be listed as text in the legend portion 103. They can then be pictorially illustrated in the predefined area portion 104 as shown in FIG. 1.

In one embodiment, the legend portion 103 further defines a plurality of sequential numerical indicia 107. In one embodiment, the plurality of sequential numerical indicia 107 indicates a predefined order in which the plurality of portions 105 of the predefined area 106 should be cleaned. In one embodiment, the plurality of sequential numerical indicia 107 comprises the numbers one through sixteen, inclusive. In one embodiment, the legend portion 103 can include a first subset 108 of the plurality of sequential numerical indicia 107. Similarly, the predefined area portion 104 can include a second subset 109 of the plurality of sequential numerical indicia 107.

In one embodiment, the first subset 108 and the second subset 109 are non-overlapping. For example, where the plurality of sequential numerical indicia 107 comprise the numbers one through sixteen, inclusive, the first subset 108 may include the numbers one through eight, inclusive, while the second subset 109 includes the numbers nine through sixteen, inclusive. Other non-overlapping subset subdivisions of the plurality of sequential numerical indicia 107 will be obvious to those of ordinary skill in the art having the benefit of this disclosure.

In one or more embodiments, the first subset 108 and the second subset 109 can be arranged in a predefined order. In one embodiment, the predefined order is an ascending order indicating in which order the plurality of portions 105 should be cleaned. For example, where the first subset 108 includes the numbers one through eight, inclusive, and the predefined order is an ascending order, a person should clean portion one prior to portion two, portion two prior to portion three, and so forth. Thus, where the predefined area 106 is a patient's hospital room and the plurality of portions 105 may include bed rails, a nurse call device, a patient table, a remote control, a table, a television, a light switch, and doorknobs, the legend portion 103 may list these items with the plurality of sequential numerical indicia 107 in the first subset 108 as follows: 1—bed rails, 2—a nurse call device, 3—a patient table, 4—a remote control, 5—a table, 6—a television, 7—a light switch, and 8—doorknobs.

In one or more embodiments, the legend portion 103 comprises one or more matrices. For example, in FIG. 1 the legend portion 103 comprises a first matrix 112 and a second matrix 113. In one embodiment, each of the first matrix 112 and the second matrix 113 comprises a 1×N matrix where N refers to the number of portions of the predefined area 106 found in that matrix. In one embodiment, the first matrix 112 and the second matrix 113 refer to different rooms within the predefined area 106. For example, in one embodiment the first matrix 112 corresponds to portions of the predefined area 106 disposed outside the restroom portion 114, while the second matrix 113 corresponds to portions of the predefined area 106 disposed within the restroom portion 114. Where the predefined area 106 is a hospital room, the first matrix 112 may correspond to the patient portion of the hospital room while the second matrix 113 corresponds to the restroom portion 114 of the hospital room. Thus, while one plurality of portions 105 of the predefined area 106 found in the first matrix 112 may be bed rails, a nurse call device, a patient table, a remote control, a table, a television, a light switch, and doorknobs, another plurality of portions 115 of the predefined area 106 found in the second matrix 113 may include a toilet seat, a toilet seat, hand rails, restroom walls, a toilet bowl, a storage area, a shower, a sink, and doorknobs. In one embodiment, the first matrix 112 and the second matrix 113 are arranged in a single column having N rows as shown in FIG. 1.

The number of portions found in each of the first matrix 112 and the second matrix 113 will vary based upon the type of predefined area 106. For example, if the predefined area 106 is a hospital room, a first number of items will be found in the first matrix 112 and second matrix 113. However, if the predefined area 106 is a hotel room, that number will change. Some predefined areas will have many portions, while others will have only a few.

In one or more embodiments, the predefined area portion 104 includes a plurality of visual indicators 110 that are assigned to the plurality of portions 105 of the predefined area 106. In one embodiment, the plurality of visual indicators 110 are assigned to the plurality of portions 105 of the predefined area 106 on a one-to-one basis such that each portion has one visual indicator. In one embodiments, each of the plurality of visual indicators 110 comprises one of the plurality of sequential numerical indicia 107. Thus, if the bed rails are number one, the visual indicator 111 assigned to the bed rails would include the number one disposed thereon. As shown in FIG. 1, in one or more embodiments each visual indicator of the plurality of visual indicators 110 comprises a circle with a number superimposed on the circle. In one or more embodiments, the circles can be color-coded as well. This will be described in more detail with reference to FIG. 2.

In one or more embodiments, other indicia 116 can be presented on the visual teaching aid 100 as well. For example, in this illustrative embodiment the other indicia 116 comprise a pictorial panel in which a picture of a predefined activity can be illustrated. In one embodiment where the visual teaching aid 100 is to assist in teaching a cleaning order for the predefined area 106, the pictorial panel may comprise an image showing a proper cleaning technique to be applied to the plurality of portions 105 of the predefined area 106 listed in the first matrix 112 and second matrix 113, respectively. Other pictorial and non-pictorial information suitable for inclusion with the other indicia 116 will be obvious to those of ordinary skill in the art having the benefit of this disclosure.

Figure 2:
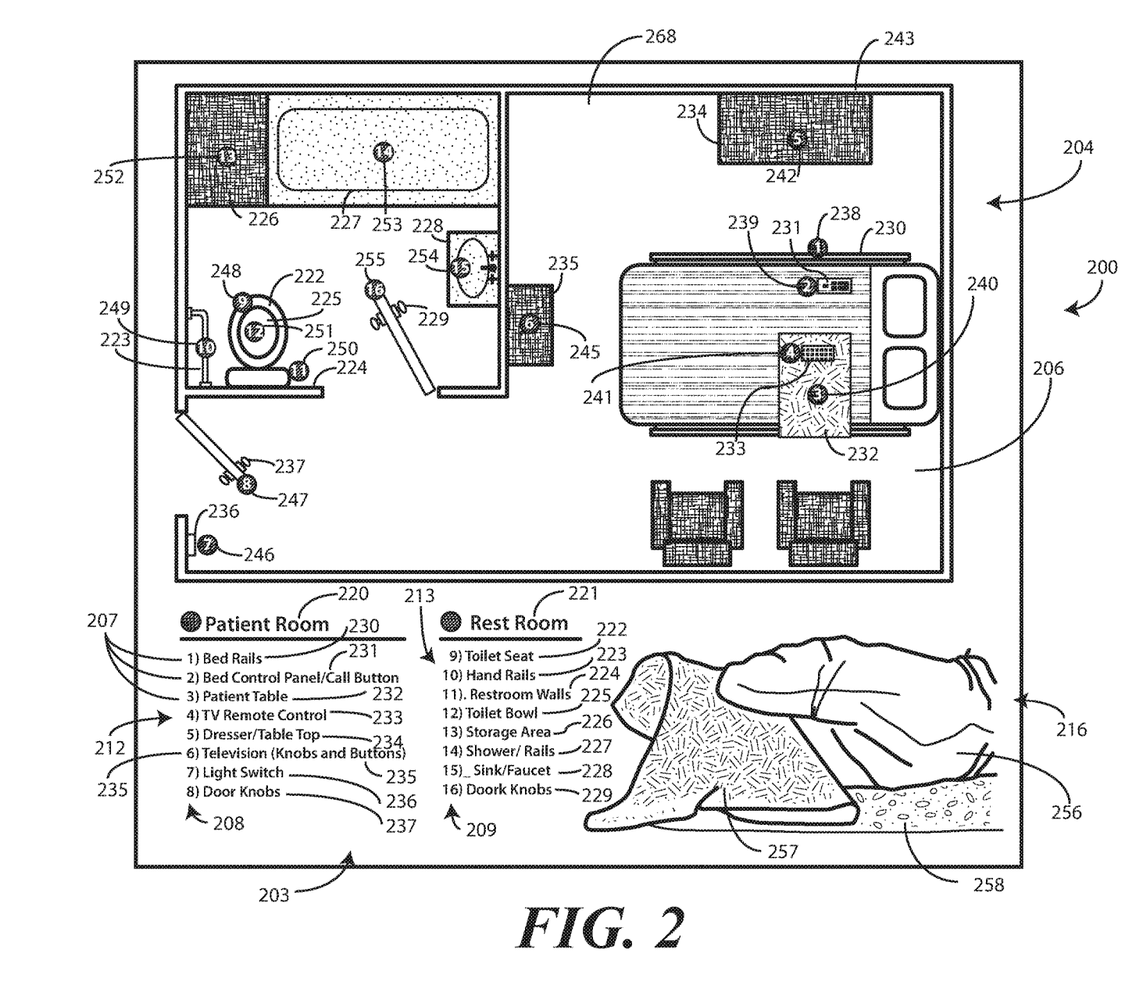
FIG. 2 illustrates another explanatory embodiment of a teaching aid in accordance with one or more embodiments of the disclosure.

Turning now to FIG. 2, illustrated therein is an explanatory teaching aid configured as a teaching insert 200 to be included with a cleaning package assembly, one of which will be shown below with reference to FIG. 7. In the explanatory teaching insert 200 of FIG. 2, the predefined area (106) comprises a hospital room. The additional room portion 204 of this teaching insert 200 illustrated the hospital room pictorially as a floor plan 243. As noted above, other types of predefined areas can be substituted for the hospital room, including motel rooms, banquet rooms, restaurant dining rooms, locker rooms, classrooms, bathrooms, spas, sports stadiums, municipal and government buildings, and so forth.

As with the visual teaching aid (100) of FIG. 1, the teaching insert is disposed along a flat substrate and includes a legend portion 203 and a additional room portion 204. Here, the predefined area 206 is a hospital room. Accordingly, the legend portion 203 is subdivided into an additional room matrix 212 for the patient portion of the hospital room exterior to the restroom portion 214 and a restroom matrix 213 for the restroom portion 214 of the hospital room.

As with the embodiment of FIG. 1, the legend portion 203 can define a plurality of portions of the hospital room, with each being listed in the legend portion 203 and shown pictorially in the additional room portion 204. In one embodiment, the restroom matrix 213 comprises a first subset 209 of a plurality of sequential numerical indicia 207, while the additional room matrix 212 comprises a second subset 208 of the plurality of sequential numerical indicia 207. In one embodiment, the first subset 209 and the second subset 208 are non-overlapping.

As shown in FIG. 2, each of the restroom matrix 213 and the additional room matrix 212 comprise a 1×N matrix arranged in a column. A header 220,221 appears at the top of the additional room matrix 212 and the restroom matrix 213, respectively. Beneath the header 220,221 are found the first subset 209 and second subset 208 of the plurality of sequential numerical indicia 207. Here, the second subset 208 comprises the numbers one through eight, inclusive, while the first subset 209 comprises the numbers nine through sixteen, inclusive.

In one embodiment, the restroom matrix 213 further defines restroom portions that are each associated with one of the plurality of sequential numerical indicia 207 on a one-to-one basis. In this illustrative embodiment, the restroom portions comprise a toilet seat 222, handrails 223, restroom walls 224, a toilet bowl 225, a storage area 226, a shower 227, a sink 228, and doorknobs 229. Each of these items is illustrated pictorially in the additional room portion 204, and more particularly in the restroom portion 214.

In one embodiment, these restroom portions are arranged in a predefined order in accordance with the plurality of sequential numerical indicia 207. For example, in this illustrative embodiment the toilet seat 222 corresponds to the number nine, the handrails 223 correspond to the number ten, the restroom walls 224 correspond to the number eleven, the toilet bowl 225 corresponds to the number twelve, the storage area 226 corresponds to the number thirteen, the shower 227 corresponds to the number fourteen, the sink 228 corresponds to the number fifteen, and the doorknobs 229 correspond to the number sixteen. Accordingly, a person cleaning these portions would start with the portion associated with the number nine, i.e., the toilet seat 222, and then move sequentially through the portions in accordance with the plurality of sequential numerical indicia 207 to the number sixteen.

Similarly, in one embodiment the additional room matrix 212 defines additional room portions that are each associated with one of the plurality of sequential numerical indicia 107 on a one-to-one basis. In this illustrative embodiment, the additional room portions comprise bed rails 230, a nurse call device 231, a patient table 232, a remote control 233, a table 234, a television 235, a light switch 236, and doorknobs 237. Each of these items is then illustrated pictorially in the additional room portion 204, and more particularly in the patient room 268.

In one embodiment, these additional room portions are arranged in a predefined order in accordance with the plurality of sequential numerical indicia 207. For example, in this illustrative embodiment the bed rails 230 correspond to the number one, the nurse call device 231 corresponds to the number two, the patient table 232 corresponds to the number three, the remote control 233 corresponds to the number four, the table 234 corresponds to the number five, the television 235 corresponds to the number six, the light switch 236 corresponds to the number seven, and the doorknobs 237 correspond to the number eight. Accordingly, a person cleaning these portions would start with the portion associated with the number one, i.e., the bed rails 230, and then move sequentially through the portions in accordance with the plurality of sequential numerical indicia 207 to the number eight.

When cleaning the entire predefined portion, a person would clean the items in the additional room matrix 212 prior to the items in the restroom matrix 213 in this embodiment. For example, the person would start with the patient room 268, cleaning the portion associated with the number one, i.e., the bed rails 230, first. The person would then move sequentially through the portions in accordance with the plurality of sequential numerical indicia 207 to the number eight, i.e., the doorknobs 237. Next, the person would move to the restroom portion 214, cleaning the portion associated with the number nine, i.e., the toilet seat 222, initially. The person would then move sequentially through the portions in accordance with the plurality of sequential numerical indicia 207 to the number sixteen, i.e., the doorknobs 229, to complete the cleaning of the predefined area 206.

To make things easier for the person, rather than having to read the restroom matrix 213 and the additional room matrix 212, the corresponding items disposed therein, and the plurality of sequential numerical indicia 207, the additional room portion 204 can include a pictorial illustration of the hospital room with each item shown pictorially as well. A plurality of visual indicators can be assigned to the plurality of portions of the predefined area on a one-to-one basis. In this illustrative example, the bed rails 230 correspond to a first visual indicator 238, the nurse call device 231 corresponds to a second visual indicator 239, the patient table 232 corresponds to a third visual indicator 240, the remote control 233 corresponds to a fourth visual indicator 241, the table 234 corresponds to a fifth visual indicator 242, the television 235 corresponds to a sixth visual indicator 245, the light switch 236 corresponds to a seventh visual indicator 246, and the doorknobs 237 correspond to an eighth visual indicator 247. Similarly, in one embodiment the toilet seat 222 corresponds to a ninth visual indicator 248, the handrails 223 correspond to a tenth visual indicator 249, the restroom walls 224 correspond to an eleventh visual indicator 250, the toilet bowl 225 corresponds to a twelfth visual indicator 251, the storage area 226 corresponds to a thirteenth visual indicator 252, the shower 227 corresponds to a fourteenth visual indicator 253, the sink 228 corresponds to a fifteenth visual indicator 254, and the doorknobs 229 correspond to a sixteenth visual indicator 255.

In one embodiment, each visual indicator 238,239,240, 241,242,245,246, 247,248,249,250,251,252,253,254,255 is configured as a circle with a number superimposed upon the circle. For example, in one embodiment the first visual indicator 238 is a circle with the number one superimposed on the circle, while the second visual indicator 239 is a circle with the number two superimposed on the circle and so forth. In one embodiment, each visual indicator 238,239, 240,241,242,245,246,247,248,249, 250,251,252,253,254, 255 is color coded as well. For example, in one embodiment the visual indicators 238,239,240,241,242,245,246,247,248 set forth in the additional room matrix 212 each comprise blue circles with white numbers disposed thereon, while the visual indicators 249,250,251,252,253,254,255 in the restroom matrix 213 each comprise red circles or green circles. This color-coding allows a person cleaning the predefined area 206 to quickly identify which portions of the predefined area 206 are to be cleaned first and which are to be cleaned second.

In this illustrative embodiment, the other indicia 216 comprises a pictorial representation of a gloved hand 256 cleaning a surface 258 with a cleaning cloth 257. As noted above, if a particular user has not been properly trained to use a particular cleaning article, they may in fact cause more contamination than they reduce. Accordingly, in one embodiment the teaching insert 200 can include a pictorial representation of a gloved hand 256 cleaning a surface 258 with a cleaning cloth 257 to provide yet even further instruction regarding proper cleaning techniques.

Figure 3:
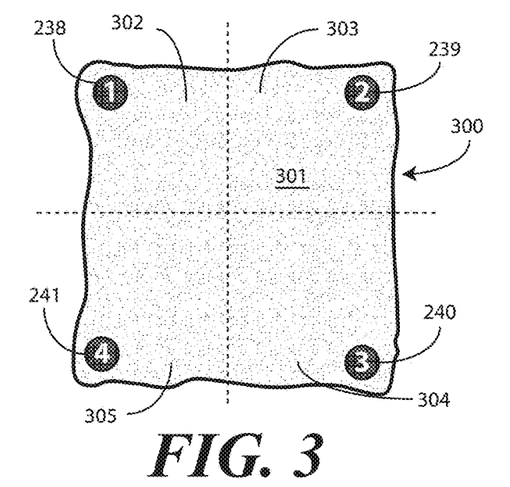
FIGS. 3-6 illustrate explanatory cleaning articles to be included in a system with a teaching insert in accordance with one or more embodiments of the disclosure.
Figure 4:
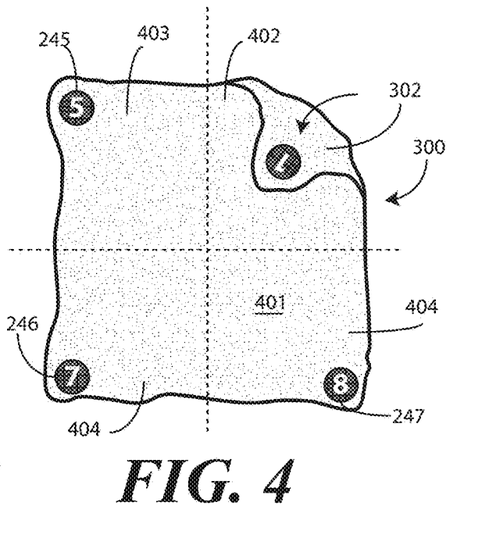
Figure 5:
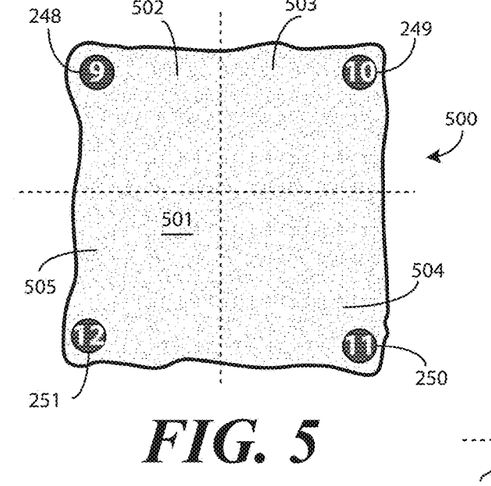
Figure 6:
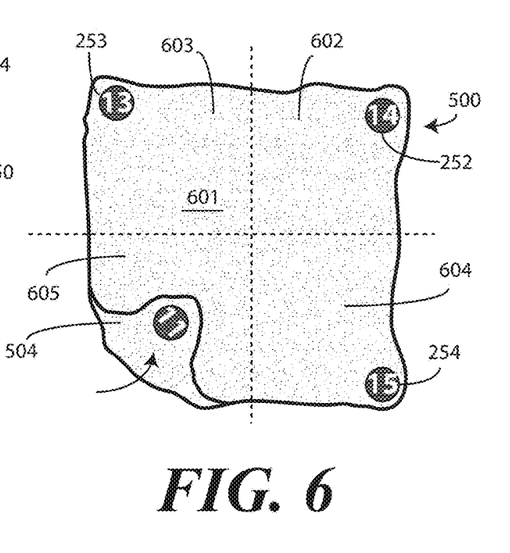

The teaching insert 200 of FIG. 2 can be included with a cleaning package assembly, as will be shown below with reference to FIG. 7. In one or more embodiments, the cleaning package assembly includes the teaching insert 200 and one or more cleaning cloths. Turning now to FIGS. 3-6, illustrated therein are explanatory cleaning cloths configured in accordance with one or more embodiments of the disclosure. FIG. 3 illustrates a front side 301 of a first cleaning cloth 300, while FIG. 4 illustrated the rear side 401 of the first cleaning cloth 300. Similarly, FIG. 5 illustrates the front side 501 of a second cleaning cloth 500, while FIG. 6 illustrated the rear side 601 of the second cleaning cloth 500.

In one or more embodiments, each cleaning cloth 300,500 defines a plurality of portions thereof. For example, in one embodiment the front side 301 of the first cleaning cloth defines a first portion 302, a second portion 303, a third portion 304, and a fourth portion 305. The rear side 401 of the first cleaning cloth 300 then defines a fifth portion 402, a sixth portion 403, a seventh portion 404, and an eighth portion 405. Similarly, the first side 501 of the second cleaning cloth 500 defines a first portion 502, a second portion 503, a third portion 504, and a fourth portion 505, while the second side 601 of the second cleaning cloth 500 defines a fifth portion 602, a sixth portion 603, a seventh portion 604, and an eighth portion 605. In one or more embodiments, each portion of the plurality of portions comprises one of the plurality of sequential numerical indicia (207) indicia to indicate the order of using the plurality of portions.

Illustrating by example, in one embodiment the first portion 302 of the first cleaning cloth 300 includes the first visual indicator 238, while the second portion 303 includes the second visual indicator 239. Similarly the third portion 304 includes the third visual indicator 240, while the fourth portion 305 includes the fourth visual indicator 241. The fifth portion 402 includes the fifth visual indicator (not shown due to the first portion 302 being flipped over) and the sixth portion 403 includes the sixth visual indicator 245. The seventh portion 404 includes the seventh visual indicator 246, while the eighth portion 405 includes the eighth visual indicator 247.

In one embodiment, the first portion 502 of the second cleaning cloth 500 includes the ninth visual indicator 248, while the second portion 503 includes the tenth visual indicator 249. Similarly the third portion 504 includes the eleventh visual indicator 250, while the fourth portion 505 includes the twelfth visual indicator 251. The fifth portion 602 includes the thirteenth visual indicator 252, and the sixth portion 603 includes the fourteenth visual indicator 253. The seventh portion 604 includes the fifteenth visual indicator 254, while the eighth portion 505 includes the sixteenth visual indicator (not shown due to the fourth portion 305 being flipped over).

The inclusion of the visual indicators along the portions of the first cleaning cloth 300 and second cleaning cloth 500, respectively, provides a mnemonic device teaching a user which portion of the cloth should be used to clean a portion of the predefined area shown on the teaching insert. Moreover, using two cleaning cloths 300,500 with eight portions each, when the first subset of the plurality of sequential numerical indicia set forth on the teaching insert correspond to the bathroom of a hospital room, and the second subset of the plurality of sequential numerical indicia correspond to the patient room of a hospital room, with the first subset and the second subset non-overlapping, and the plurality of sequential numerical indicia comprising the numbers one through sixteen, inclusive, the entire hospital room can be cleaned only using two cleaning cloths 300,500.

In one or more embodiments, each of the first cleaning cloth 300 and the second cleaning cloth 500 has dimensions of either twelve by twelve inches or sixteen by sixteen inches. These dimensions, being larger than the ordinary human hand, allow for a "flip and fold" technique where each portion of the cleaning cloths 300,500 can be used on a particular portion of the hospital room. For example, the first portion 302 of the front side 301 of the first cleaning cloth 300 can be used to clean the bed rails (230) of the hospital room, while the second portion 303 of the front side 301 of the first cleaning cloth 300 can be used to clean the nurse call device (231) when using the teaching insert (200) of FIG. 2 as a guide.

The provision of these portions of the cleaning cloths 300,500 also serves as another mnemonic indicator that the person cleaning the hospital room should not "wad" or "crumple" the cloths, which can result in portions of the cloth not being used before the cloth becomes contaminated with bacteria. The provision of these portions of the cleaning cloths 300,500 also serves as another mnemonic indicator that prevents the cross contamination of germs and other microorganisms by providing separate quadrants of separate sides of each cloth that should be used only to clean one item. The implicit practice of "flipping and folding" each cloth in accordance with the visual indicators works to reduce both problems, as well as preventing a person from forgetting which parts of each cleaning cloth 300,500 have already been used. It further works to prevent improper folding that can cause cross contamination as well. The cleaning cloths 300,500 of FIGS. 3-6 are simple to use, especially when used in conjunction with the teaching insert (200) of FIG. 2.

Figure 7:
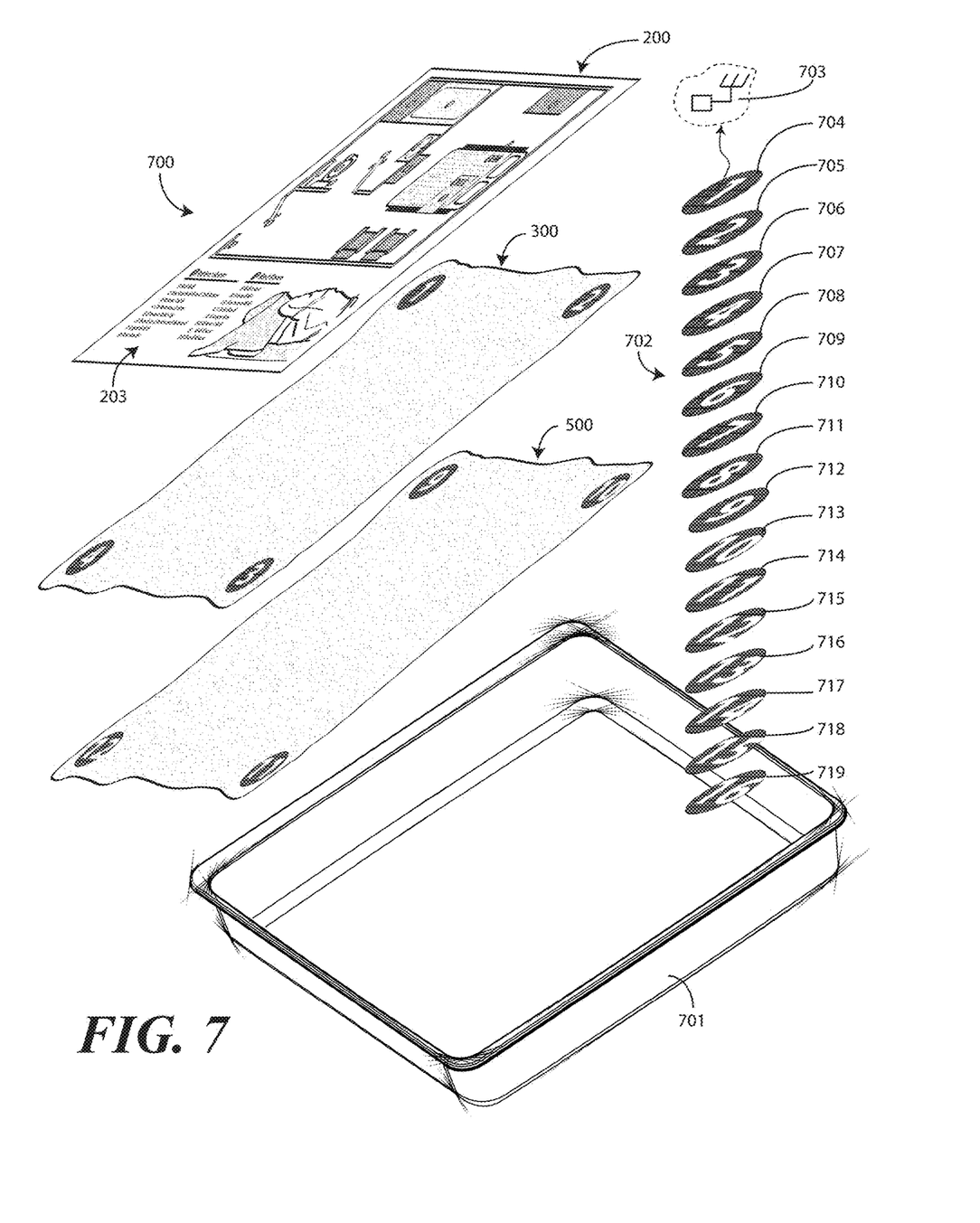
FIG. 7 illustrates one explanatory cleaning package assembly in accordance with one or more embodiments of the disclosure.

Turning now to FIG. 7, illustrated therein is one explanatory cleaning package assembly 700 configured in accordance with one or more embodiments of the disclosure. The explanatory cleaning package assembly 700 of FIG. 7 is shown in an exploded perspective view for ease of illustration.

As shown in FIG. 7, the cleaning package assembly 700 includes a package 701, with one or more cleaning cloths disposed within the package 701. In this illustrative embodiment, the cleaning cloths comprise the first cleaning cloth 300 and the second cleaning cloth 500 of FIGS. 3-5 above. The cleaning package assembly 700 also includes an instructional insert. Here, the instructional insert is the teaching insert 200 of FIG. 2. The instructional insert is disposed within the package 701 with the one or more cleaning cloths and serves to instruct an order of using the portions of each cleaning cloth as previously described.

In one or more embodiments, the cleaning package assembly 700 further includes a plurality of markers 702. The plurality of markers 702 can be placed on various items within a predefined area, such as a hospital room.

The plurality of markers 702 can take any of a variety of forms. In one embodiment, each marker comprises a sticker that can be adhesively attached to the items in a hospital room, and in particular, the items listed in the legend portion of the instruction insert.

Figure 8:
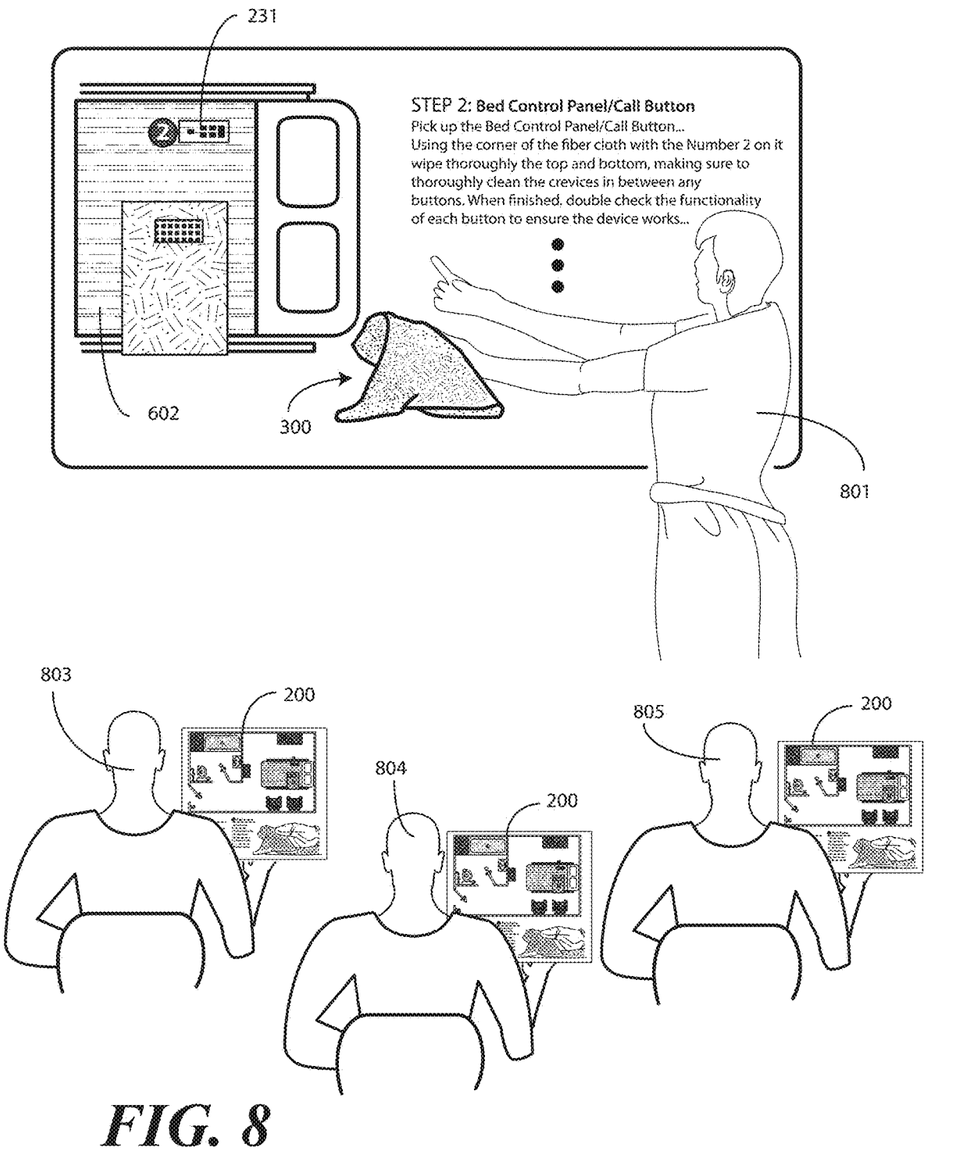
FIG. 8 illustrates an explanatory method in accordance with one or more embodiments of the disclosure.

In one embodiment, each marker is color coded as well. For example, in one embodiment markers 704, 705, 706, 707, 708, 709, 710, 711 each comprise blue circles with white numbers disposed thereon. The numbers correspond to the plurality of sequential numerical indicia set forth in the legend portion 203 of the teaching insert 200. Similarly, markers 712, 713, 714, 715, 716, 717, 718, 719 can each comprise red circles or green circles with white numbers disposed thereon. This color-coding allows a person cleaning the predefined area to quickly identify which portions of the predefined area are to be cleaned first and which are to be cleaned second. As shown in FIG. 8, in one embodiment the plurality of markers 702 each comprise a circle with a number superimposed on the circle.

In one embodiment, each marker comprises a Radio Frequency Identification (RFID) circuit 703. The RFID circuit 703 can include a transmission antenna to transmit to RFID readers so that a person cleaning can simply walk past a particular marker and identify its sequence within the sequential numerical indicia quickly and efficiently. In one embodiment, each RFID circuit 703 includes a control device coupled to an oscillation frequency component. The oscillation frequency component can be an impedance component used in conjunction with an RC timing circuit, or alternatively may be an inductance component that works to determine a transmission frequency in an LC circuit. Alternatively, it can be a capacitive device.

RFID devices are but one technology that can be included with each marker. In another embodiment, each marker includes a motion detector or other sensor that triggers and records data when someone is close to it. Accordingly, a supervisor can quickly identify which portions of the predefined area were cleaned, when they were cleaned, and by whom. Other technologies that can be incorporated into the markers will be obvious to those of ordinary skill in the art having the benefit of this disclosure.

As shown in FIG. 7, each marker can comprise one of the plurality of sequential numerical indicia (207) shown on the instruction insert. When these markers are placed on items in a hospital room, a person can use the instruction insert and the cleaning cloths to quickly and efficiently clean the hospital room with little or no training whatsoever.

It should be noted that inclusion of the teaching insert (200) with a cleaning package assembly 700 is but one way of using a visual teaching aid (100) configured in accordance with one or more embodiments of the disclosure. Turning now to FIG. 8, illustrated therein is another embodiment. Still other embodiments will be obvious to those of ordinary skill in the art having the benefit of this disclosure.

As shown in FIG. 8, an instructor 801 is demonstrating how to use a cleaning cloth 300 to clean nurse call device 231 in a hospital room. Embodiments of the disclosure advantageously allow the presentation of portions of the teaching insert (200), i.e., the hospital bed 802 in this illustration, on visible media, such as a flat substrate or electronic device. Subsequently, the instructor 801 can scroll through other portions of the teaching insert (200) to discuss cleaning of other items.

In this embodiment, each student 803, 804, 805 has been given the teaching insert 200 from FIG. 2. Accordingly, as the instructor 801 discusses the portion of a predefined area to be cleaned, as that portion is being presented on the wall, and as the instructor 801 manipulates the cleaning cloth 300 to demonstrate the proper flip and fold technique, each student 803, 804, 805 has pictorial images on a compact, easy to carry and store, teaching insert 200. Each student 803, 804, 805 can then follow along on their teaching insert 200 while the instructor 801 teaches a cleaning order for a predefine area. The instructor 801 can also discuss the application of a plurality of markers (702) to objects as they are being discussed as well.

Figure 9:
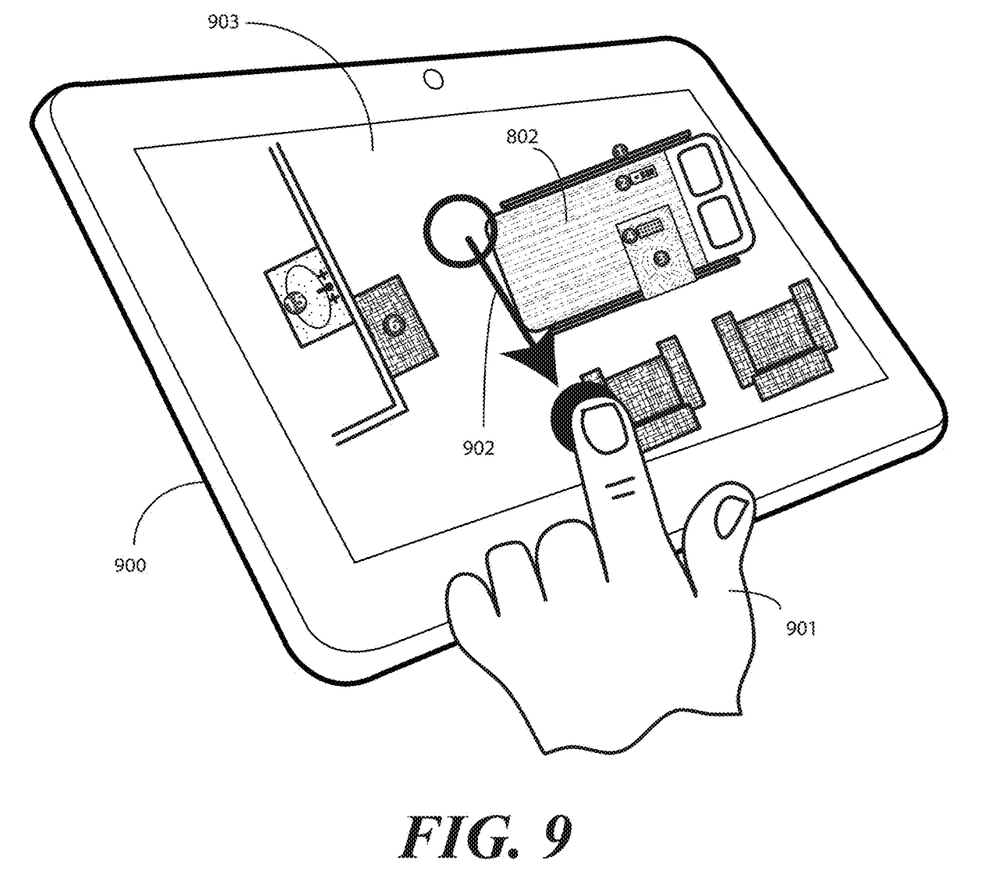
FIG. 9 illustrates yet another explanatory embodiment of a teaching aid in accordance with one or more embodiments of the disclosure.

In yet another embodiment the presentation can be on the display of an electronic device, as shown in FIG. 9. Turning briefly to FIG. 9, a user 901 is manipulating 902 the touch-sensitive display 903 of an electronic device 900. The teaching insert 200 of FIG. 2 is being presented on the display 903 of the electronic device 900. The user 901 can accordingly scroll through the teaching insert 200 at their leisure.

In one or more embodiments, the user 901 can actuate a user actuation target to cause an education module operable in the electronic device 900 to present the teaching insert 200. The user 901 may also be able to interact with presentations objects to be cleaned. For example, the user 901 may be able to click on an item such as the hospital bed 802 to watch items associated therewith being cleaned with the first cleaning cloth (300) using the proper flip and fold technique. Additionally, the user 901 may be able to select an item to cause an interactive multi-dimensional rendering to appear on the display 903.

Examples of the electronic device 900 include iPod®, iPhone®, or iPad® devices manufactured by Apple Inc., of Cupertino, Calif., cellular telephones or messaging devices such as the Blackberry® manufactured by Research in Motion, Inc., pocket-sized personal computers such as an iPAQ® Pocket PC available by Hewlett Packard Inc., palm-top and tablet style computers running the Android® operating system, such as those manufactured by HTC, Inc., and Motorola, Inc., or any of the other various personal digital assistants, desktop computers, laptop computers, or other electronic devices.

In one or more embodiments, the teaching insert 200 can be configured as a downloadable application or "app" suitable for execution on the electronic device 900. The teaching insert 200 can be configured as stand-alone software, suitable for storage in any of a number of computer readable media for execution by any number of processing devices.

Figure 10:
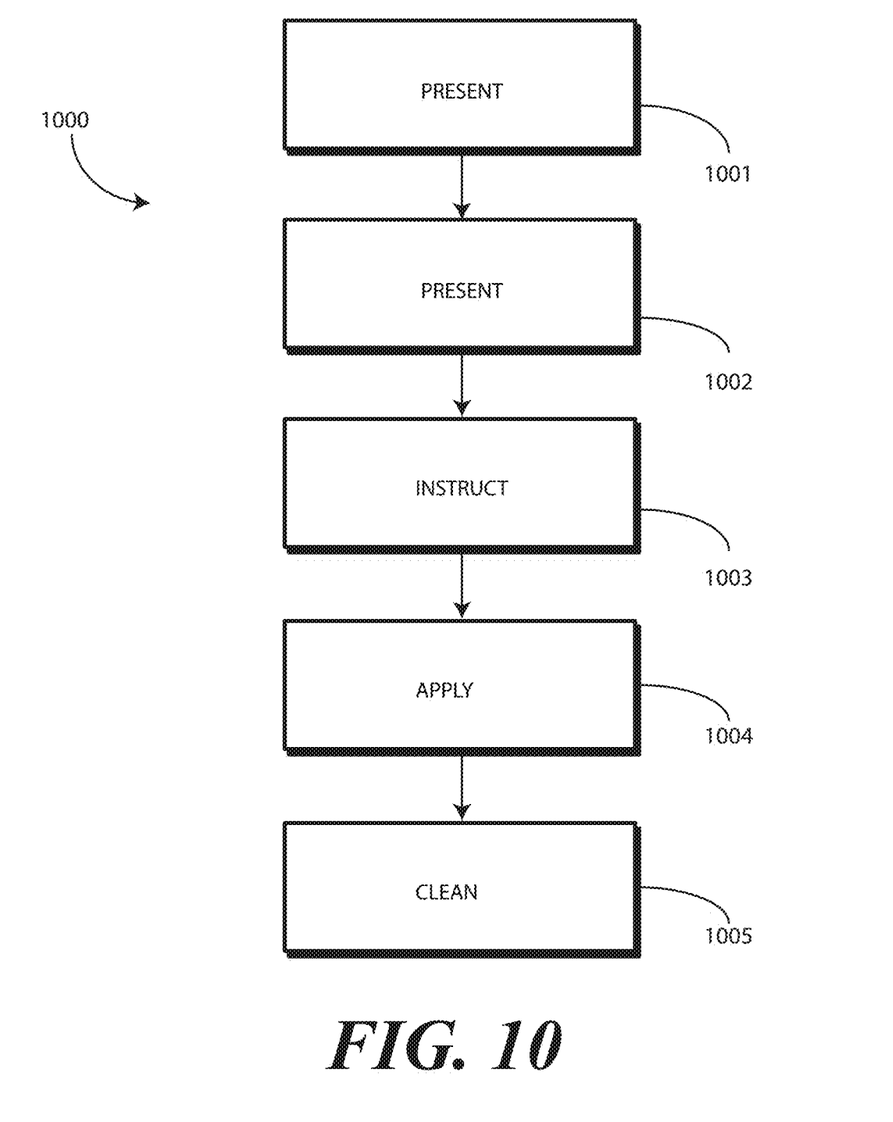
FIG. 10 illustrates another explanatory method in accordance with one or more embodiments of the disclosure.

Turning now to FIG. 10, illustrated therein is one explanatory method 1000 of using a visual teaching aid, cleaning package assembly, or combinations thereof in accordance with one or more embodiments of the disclosure. In one embodiment the method 1000 is for teaching a cleaning order of a predefined area, such as a hospital room.

At step 1001, the method 1000 includes presenting a plurality of portions of the predefined area on a teaching aid such that each portion is pictorially illustrated to be visually perceptible to a viewer with one of a plurality of visual indicators comprising a circle with a number superimposed on the circle corresponding to the each portion. At step 1002, the method 1000 can include presenting, on the teaching aid, a legend defining a the plurality of portions in a predefined order with the each portion depicted with one of a plurality of sequential numerical indicia defining the cleaning order for the predefined area.

At step 1003, the method 1000 can optionally include instructing the use of one or more cleaning cloths to clean the predefined area by identifying the one of the plurality of sequential numerical indicia disposed on the one or more cleaning cloths. At optional step 1004, the method 1000 can include applying one or more markers to one or more objects in the predefined area, where those objects correspond to the portions of the legend on a one-to-one basis. At step 1005, the method 1000 comprises cleaning the predefined area in the predefined order.

A portion of the disclosure of this patent document contains material to which a claim for copyright is made. The copyright owner has no objection to the facsimile reproduction by anyone of the patent document or the patent disclosure as it appears in the Patent and Trademark Office patent file or records, but reserves all other copyrights whatsoever.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A cleaning package assembly, comprising:
   a package;
   one or more cleaning cloths disposed within the package, each cleaning cloth defining a plurality of portions thereof; and an instructional insert, disposed within the package with the one or more cleaning cloths and instructing an order of using the plurality of portions to clean a predefined area;

the instructional insert comprising a plurality of sequential numerical indicia defining a cleaning order for the predefined area; and each portion of the plurality of portions comprising one of the plurality of sequential numerical indicia to indicate the order of using the plurality of portions.

2. The cleaning package assembly of claim 1, the predefined area comprising a hospital room.

3. The cleaning package assembly of claim 2, a first subset of the plurality of sequential numerical indicia corresponding to a bathroom of the hospital room.

4. The cleaning package assembly of claim 3, a second subset of the plurality of sequential numerical indicia corresponding to a patient room of the hospital room, the first subset and the second subset non-overlapping.

5. The cleaning package assembly of claim 4, the plurality of sequential numerical indicia comprising numbers one through sixteen, inclusive.

6. The cleaning package assembly of claim 4, the first subset commencing with a toilet portion and concluding with doorknobs.

7. The cleaning package assembly of claim 4, the second subset commencing with a bed portion and concluding with doorknobs.

8. The cleaning package assembly of claim 2, the hospital room illustrated pictorially as a floor plan.

9. The cleaning package assembly of claim 2, further comprising a plurality of markers, each marker comprising the one of the plurality of sequential numerical indicia.

10. The cleaning package assembly of claim 9, the each marker comprising a Radio Frequency Identification (RFID) tag.

11. The cleaning package assembly of claim 1, wherein the instructional insert comprises:

a legend portion defining a plurality of portions of the predefined area; and a predefined area portion pictorially illustrating the plurality of portions of the predefined area;

the legend portion defining the plurality of sequential numerical indicia, wherein the cleaning order comprises a predefined order in which the plurality of portions of the predefined area should be cleaned; and the predefined area portion comprising a plurality of visual indicators assigned to the plurality of portions of the predefined area on a one-to-one basis, each visual indicator comprising one of the plurality of sequential numerical indicia.

12. The cleaning package assembly of claim 11, the legend portion comprising a restroom matrix comprising a first subset of the plurality of sequential numerical indicia and an additional room matrix comprising a second subset of the plurality of sequential numerical indicia.

13. The cleaning package assembly of claim 12, the predefined area comprising a hospital room, the first subset and the second subset non-overlapping.

14. The cleaning package assembly of claim 13, the restroom matrix and the additional room matrix each comprising a 1×N matrix arranged in a column, the first subset comprising numbers one through eight, inclusive, the second set comprising the numbers nine through sixteen inclusive.

15. The cleaning package assembly of claim 14, the restroom matrix further defining restroom portions each associated with one of the plurality of sequential indicia on a one-to-one basis, the restroom portions comprising:

a toilet seat;
hand rails;
restroom walls;
a toilet bowl;
a storage area;
a shower;
a sink; and
doorknobs.

16. The cleaning package assembly of claim 15, the restroom portions arranged in as set forth in claim 15.

17. The cleaning package assembly of claim 14, the additional room matrix defining additional room portions each associated with one of the plurality of sequential indicia on a one-to-one basis, the additional room portions comprising:

bed rails;
a nurse call device;
a patient table;
a remote control;
a table;
a television;
a light switch; and
doorknobs.

18. The cleaning package assembly of claim 17, the additional portions arranged in as set forth in claim 17.

19. The cleaning package assembly of claim 11, the instructional insert presented on a display of an electronic device, each of the plurality of visual indicators comprising a circle with a number superimposed on the circle.

* * * * *